(12) United States Patent
Burghes

(10) Patent No.: US 12,309,063 B2
(45) Date of Patent: May 20, 2025

(54) SYSTEMS AND METHODS FOR REMOTE SYNTHETIC TRANSACTIONS VIA A TUNNEL TO DISTRIBUTED AGENTS

(71) Applicant: NetScout Systems, Inc., Westford, MA (US)

(72) Inventor: Andrew Burghes, Silchester (GB)

(73) Assignee: NetScout Systems, Inc., Westford, MA (US)

( * ) Notice: Subject to any disclaimer, the term of this patent is extended or adjusted under 35 U.S.C. 154(b) by 0 days.

(21) Appl. No.: 18/462,981

(22) Filed: Sep. 7, 2023

(65) Prior Publication Data

US 2024/0356840 A1   Oct. 24, 2024

Related U.S. Application Data

(60) Provisional application No. 63/460,532, filed on Apr. 19, 2023.

(51) Int. Cl.
*H04L 45/00* (2022.01)
*H04L 9/40* (2022.01)
*H04L 45/12* (2022.01)

(52) U.S. Cl.
CPC .......... *H04L 45/566* (2013.01); *H04L 45/123* (2013.01); *H04L 63/029* (2013.01)

(58) Field of Classification Search
None
See application file for complete search history.

(56) References Cited

U.S. PATENT DOCUMENTS

| | | | |
|---|---|---|---|
| 7,843,843 B1 | 11/2010 | Papp et al. | |
| 2002/0026503 A1* | 2/2002 | Bendinelli | H04L 63/0272 709/223 |
| 2004/0013130 A1* | 1/2004 | Blanchet | H04L 69/16 370/466 |
| 2010/0098092 A1* | 4/2010 | Luo | H04L 12/4633 370/401 |
| 2013/0060906 A1* | 3/2013 | Gan | H04L 63/029 709/219 |
| 2013/0298182 A1* | 11/2013 | May | H04L 63/10 726/1 |
| 2014/0269371 A1 | 9/2014 | Badea et al. | |
| 2018/0332003 A1* | 11/2018 | Deriso | H04L 63/0823 |
| 2019/0109713 A1* | 4/2019 | Clark | G06F 16/182 |
| 2019/0278681 A1 | 9/2019 | Grinkemeyer et al. | |
| 2022/0060452 A1* | 2/2022 | Kosbab | G06F 21/552 |
| 2022/0278889 A1* | 9/2022 | Malleshaiah | H04L 41/0631 |
| 2022/0329510 A1* | 10/2022 | Barrett | H04L 43/106 |

OTHER PUBLICATIONS

International Search Report and Written Opinion on PCT/US2024/018197 mailed Jul. 5, 2024 (16 pages).

* cited by examiner

*Primary Examiner* — Scott B Christensen
(74) *Attorney, Agent, or Firm* — Foley & Lardner LLP

(57) ABSTRACT

Systems and methods for remote synthetic transactions is provided. A system may create a tunnel between the system and a device to perform remote synthetic transactions. The system may be at a location other than a location of the device and remotely transfer data packets to the device to be sent to a service of a service provider via a network. The data packets may appear to originate from the device and be handled accordingly by the service. The system may receive a response to the synthetic transactions from the device and provide an indication of performance of the synthetic transaction based on the response.

20 Claims, 8 Drawing Sheets

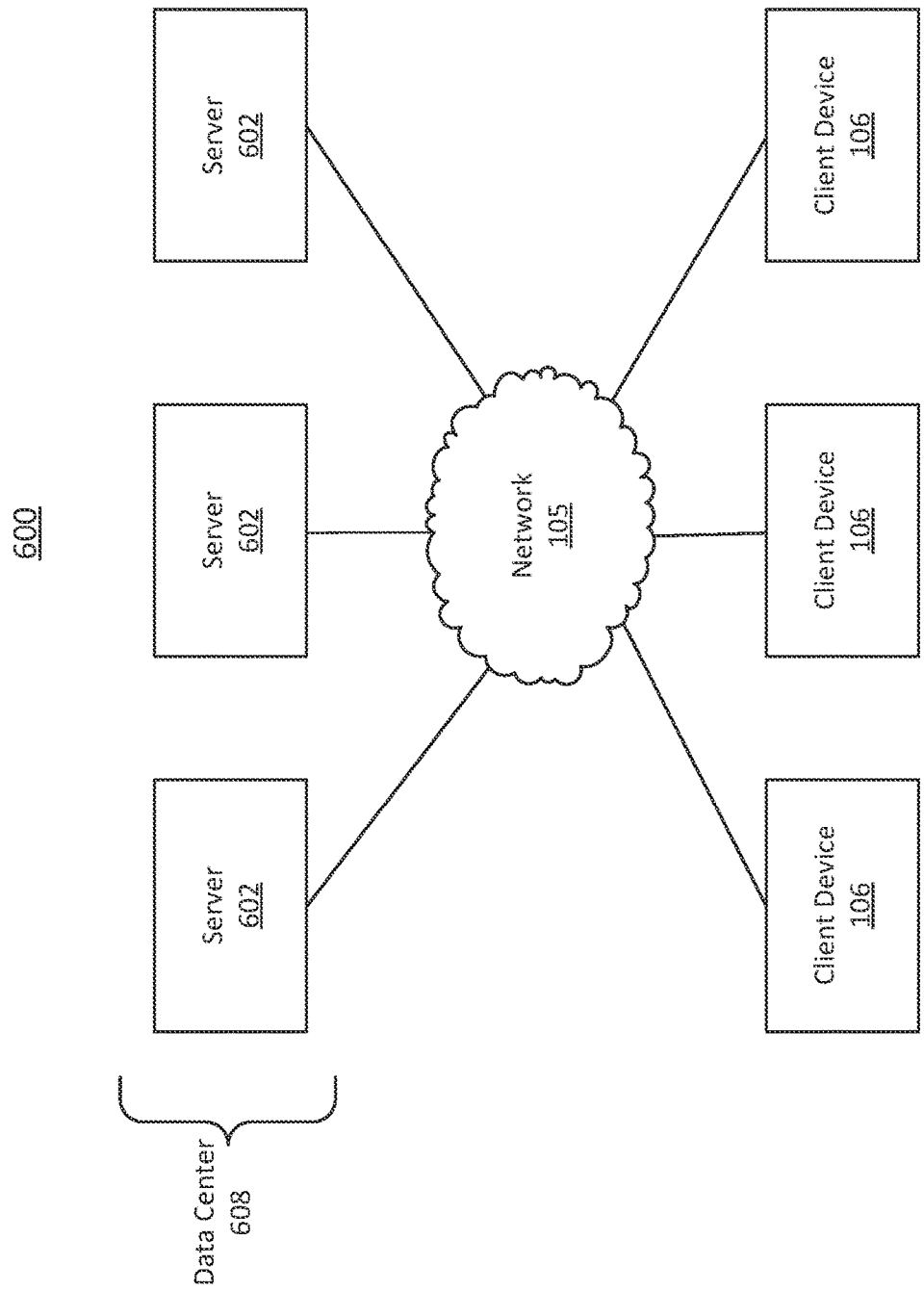

SYSTEMS AND METHODS FOR REMOTE SYNTHETIC TRANSACTIONS VIA A TUNNEL TO DISTRIBUTED AGENTS

CROSS-REFERENCES TO RELATED APPLICATIONS

This application claims the benefit of priority under 35 U.S.C. § 119 to U.S. Provisional Patent Application No. 63/460,532, filed Apr. 19, 2023, which is hereby incorporated by reference herein in its entirety.

BACKGROUND

Digital services can be provided by servers to client devices over a network, such as the Internet. For example, servers can provide access to web sites, applications, content, or other digital services. Providers or users of the digital services can periodically test the digital services and content to evaluate the performance of the digital services, or identify issues associated with providing the digital services. However, due to the various security protocols, various networks used by client devices to access digital services, or lack of functionality of certain devices, it can be challenging to perform a test to reliably evaluate the performance of a digital service.

SUMMARY

Systems and methods of this technical solution are directed to remote synthetic transactions. Client devices can access, via a network, a digital service (e.g., cloud service or application) hosted or provided by a service provider. The application can be a software-as-a-service ("SaaS") that executes on a server remote from the client device. The data processing system can initiate a synthetic transaction to test the performance of the digital service. However, because the client device can be located at a home or commercial location, it may not be possible to deploy a probe or other hardware or install software to execute the synthetic transaction at the location of the client device. Thus, systems and methods of the techniques described herein can provide a data processing system at a remote location (e.g., a location other than a location of the client device) that can execute the synthetic transaction (e.g., appearing to originate from the client device). The data processing system can create a tunnel between the client device and the data processing system and transmit data packets to the client device, via the tunnel, as part of the synthetic transaction. The data processing system can receive a response to the synthetic transaction via the tunnel and provide a notification indicating a performance of the synthetic transaction.

At least one aspect is directed to a system for performing synthetic transactions remotely. The system can include a data processing system including memory and a processor to execute code stored by the memory. The data processing system can receive a request to execute a synthetic transaction to determine a performance with which a telecommunications device, remote from the data processing system, accesses a service hosted by one or more servers via a network. The data processing system can create, responsive to the request to execute the synthetic transaction, a tunnel between the data processing system and the telecommunications device, the tunnel configured to encapsulate packets transmitted via the tunnel. The data processing system can execute, responsive to the request, the synthetic transaction by transmission of one or more data packets via the tunnel to the telecommunications device. The data processing system can receive, responsive to execution of the synthetic transaction via the tunnel to access the service hosted by the one or more servers via the network, a response via the tunnel. The data processing system can provide, based on the response received via the tunnel, a notification indicative of the performance of the execution of the synthetic transaction by the telecommunications device.

At least one aspect is directed to a method for performing synthetic transactions remotely. The method can be performed by one or more processors. For example, the method can be performed by one or more processors of a data processing system or a cloud computing system via a virtual machine. The method can include the one or more processors executing code stored on memory of a data processing system. The method can include the data processing system receiving a request to execute a synthetic transaction to determine a performance with which a telecommunications device, remote from the data processing system, accesses a service hosted by one or more servers via a network. The method can include the data processing system creating, responsive to the request to execute the synthetic transaction, a tunnel between the data processing system and the telecommunications device, the tunnel configured to encapsulate packets transmitted via the tunnel. The method can include the data processing system executing, responsive to the request, the synthetic transaction by transmission of one or more data packets via the tunnel to the telecommunications device. The method can include the data processing system receiving, responsive to execution of the synthetic transaction via the tunnel to access the service hosted by the one or more servers via the network, a response via the tunnel. The method can include the data processing system providing, based on the response received via the tunnel, a notification indicative of the performance of the execution of the synthetic transaction by the telecommunications device.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 6A is a block diagram depicting an implementation of a network environment including a client device in communication with a server device;

DETAILED DESCRIPTION

Figure 1:
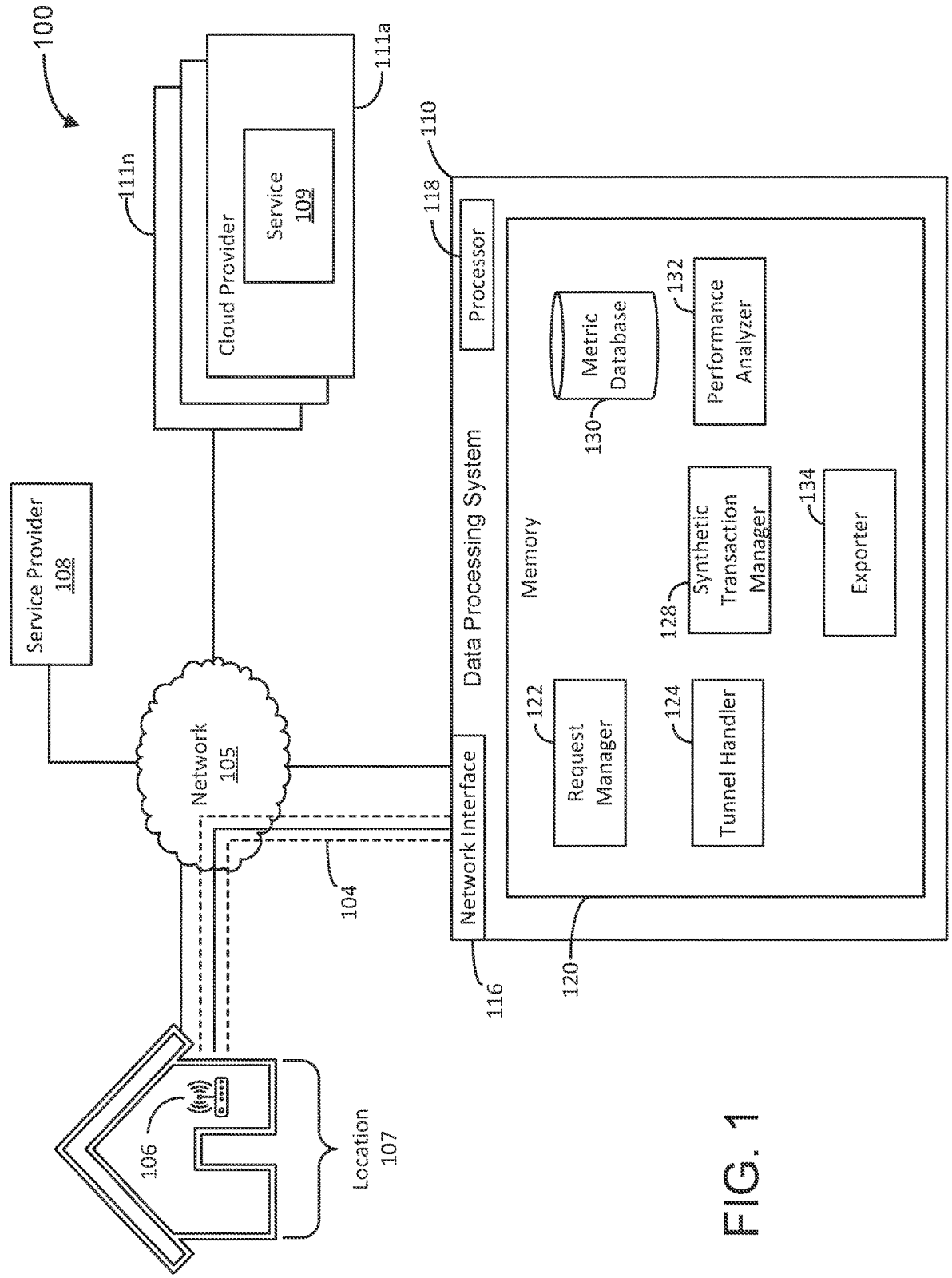
FIG. 1 is an illustration of a system for remote synthetic transactions, in accordance with an implementation.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Organizations can provide digital services, such as a website or application, over a network. To test the availability or performance of the digital service, the organization can execute synthetic transactions. A synthetic transaction can refer to simulating activities performed by an application or client device accessing the digital service. The synthetic transaction can be performed at any time and can facilitate evaluating the availability and performance of a digital service (e.g., at times when human users may be less active or not active). For example, if a business service becomes unavailable over the weekend, users of that service may not find out until Monday morning. However, by using synthetic transactions to test the availability and performance of a service at regular intervals (e.g., every hour) the operator can be alerted to problems shortly after they occur and can take remedial action. By regularly performing the synthetic transactions, a system of this technical solution can establish a baseline for normal behavior of a digital service. Upon detecting a deviation from the established baseline, the system can generate an alert notifying the operator of the digital service of a performance or availability issue.

For example, the digital service can include various software and websites, including, but not limited to, a video streaming website, a collaboration service website, sales management platform, or productivity software (e.g., online video streaming service, online marketplace, an electronic commerce service provider, word processing, spreadsheet application, presentation application, or cloud storage). The client device that accesses the digital service can be located at a residential location, such as their home location, house, apartment, or condominium. In some cases, the client device can include or refer to a physical device located at the residential location (e.g., a customer premises equipment (CPE), a router, a cable model, a 5G wireless modem, a switch, or an access point), and in some cases the client device can include or refer to a virtual machine hosted or running on one or more processors or servers in a cloud computing environment. The residential location of the user can refer to a location that is different from a commercial location, such as the office or building of an organization. In some cases, the client device can include or refer to a physical device located at a commercial location, such as a branch office or retail site.

An illustrative synthetic business transaction test on the collaboration service web site can include the following sequence of individual tests: 1) log into the web site homepage; 2) join a meeting; 3) wait in the meeting; 4) leave the meeting; and 5) log out. Similar tests replicating user behavior may be conducted via a synthetic transaction. The system can detect a problem with one or more of these tests. To debug or better understand the problem (to resolve the problem), an operator of the digital service can view the contents of the data packets that were sent between the client device and the web server providing the digital service. Viewing the contents allows for detailed troubleshooting (e.g., inspecting the different hypertext transfer protocol ("HTTP") headers generated by both the client device and the server, the HTTP response codes generated for different subcomponents of an HTTP page, or code such as JavaScript).

To obtain the data packets transmitted between the client device at the residential location and the server hosting the digital service, some systems may include, at the residential location, a probe that generates a packet capture trace file. The probe can be a standalone device, or a software component executed by a client device. However, installing a probe at every location (e.g., residential and/or commercial) of client devices, whether in hardware or software, may result in various inefficiencies (e.g., increased human, physical, and software resources). For example, client devices may not include sufficient resources (e.g., central processing unit (CPU), memory, storage, etc.) to install the probe.

The techniques described herein may overcome the aforementioned technical deficiencies. For example, a computer may operate to perform a synthetic transaction for a telecommunications device (e.g., a client device) at a location other than the location of the telecommunications device. To do so, the computer may operate to create a tunnel between the computer and the telecommunications device. The computer may transmit data packets to the telecommunications device, via the tunnel, for the telecommunications device to send to a test destination (e.g., a server, a website, an application, etc.). Responsive to transmitting the data packets, the computer may receive a response, from the telecommunications device via the tunnel, for the synthetic transaction. The computer may provide information associated with the execution of the synthetic transaction to a service provider. In some cases, to create the tunnel, the computer may configure the telecommunications device for accepting tunnel requests.

The techniques described herein may result in various advantages over the aforementioned technical deficiencies. For example, adopting the remote synthetic transaction process described herein may allow for reduced physical configuration and client resources (e.g., physical, software, etc.) by providing a remote option for performing synthetic transactions, among other advantages.

FIG. 1 illustrates an example system 100 for remote synthetic transactions. In brief overview, the system 100 can include, access, or otherwise interface with one or more of a client device 106, a service provider 108 (e.g., an internet service provider (ISP)), cloud providers 111a-n (hereinafter cloud provider 111 or service providers 111), and data processing system 110. The client device 106 can include one or more processors. The client device 106 may be physically located at location 107 (e.g., a residential location, a commercial location, etc.). The client device 106 may be an example of a CPE or other device that can access a network 105. The client device 106 can communicate with the service providers 108 via the network 105 to access a service 109 (e.g., a website, an application, etc.) via a cloud provider 111. The client device 106 can communicate with the data processing system 110 via the network 105.

The data processing system 110, the client device 106, or the service provider 108 can include or execute on one or more processors or computing devices (e.g., computing device 604 depicted in FIG. 6C) and communicate via the network 105. The network 105 can include computer networks such as the Internet, local, wide, metro, or other area networks, intranets, satellite networks, and other communication networks such as voice or data mobile telephone networks. Via the network 105, the client device 106 can access information or data provided by the service 109. For example, the network 105 can be used to access information resources such as web pages, web sites, domain names, or uniform resource locators that can be presented, output, rendered, or displayed on at least one computing device, such as a laptop, desktop, tablet, personal digital assistant, smart phone, portable computers, or speaker.

Each of the client device 106, the data processing system 110, or the service provider 108 can include or utilize at least one processing unit or other logic device such as programmable logic array engine, or module configured to communicate with one another or other resources or databases. The components of the client device 106, the service providers 108, and/or the data processing system 110 can be separate components or a single component. The system 100 and its components can include hardware elements, such as one or more processors, logic devices, or circuits.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), universal mobile telecommunications system ("UMTS"), third generation wireless mobile telecommunications ("3G"), fourth generation wireless mobile telecommunications ("4G"), long term evolution wireless broadband communication ("LTE"), fifth generation wireless mobile telecommunication ("5G"), etc. Different types of data may be transmitted via different protocols, or the same types of data may be transmitted via different protocols. In some embodiments, the network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

The cloud provider 111 can be hosted by a third-party cloud service provider. The cloud provider 111 can be hosted in a public cloud, a co-location facility, or a private cloud. The cloud provider 111 can be hosted in a private data center, or on one or more physical servers, virtual machines, or containers of an entity or customer. The cloud provider 111 may each be or include servers or computers configured to transmit or provide services 109 across network 105 to client devices 106. The cloud provider 111 may transmit or provide such services 109 upon receiving requests for the services 109 from any of the client devices 106. The term "service" as used herein includes the supplying or providing of information over a network, and is also referred to as a communications network service. Examples of services 109 may include 5G broadband services, any voice, data or video service provided over a network, smart-grid network, digital telephone service, cellular service, Internet protocol television (IPTV), etc. The service 109 may further include a SaaS application, such as a word processing application, spreadsheet application, presentation application, electronic message application, file storage system, productivity application, or any other SaaS application. The cloud provider 111 can be hosted or refer to cloud 610 depicted in FIG. 6B.

The client device 106 can establish communication sessions with the service providers 108 to receive data from the cloud providers 111. For example, a user associated with the client device 106 may request a service 109. Responsive to the request, a cloud provider 111 associated with the service 109 may send requested data to the client device 106 in a communication session. The client devices 106 may establish communication sessions with the cloud providers 111 for any type of application or for any type of call.

The client device 106 can be located or deployed at any location in the network environment depicted in FIG. 1. The client device 106 can be deployed at the location 107. The location 107 can include a location in which it may be challenging to deploy a probe. The location 107 can be a location that does not include a probe, or where it may be difficult or not desired to provide a probe. For example, the location 107 can refer to a residential location or non-commercial location, such as a home, house, apartment, condominium or other residential place of a user. The location 107 can refer to where a user lives. The location 107 can be different from where the data processing system 110 is located or where the service provider 108 is located. In some cases, the location 107 can be a commercial location, such as a branch office, a retail site, or a public space (e.g., an airport or library). The techniques described herein can apply to a situation in which synthetic tests are generated on a data processing system 110 (e.g., at a location other than location 107).

The data processing system 110 may include one or more processors 118 that may be configured to create a tunnel 104 between the data processing system 110 and the client device 106, execute a synthetic transaction for the client device 106, and indicate performance of the synthetic transaction. The data processing system 110 can include a network interface 116, the one or more processors 118, and memory 120. The data processing system 110 may communicate with any of the client device 106 and/or the service providers 108 via the network interface 116. The processor 118 may be or include an ASIC, one or more FPGAs, a DSP, circuits containing one or more processing components, circuitry for supporting a microprocessor, a group of processing components, or other suitable electronic processing components. In some embodiments, the processor 118 may execute computer code or modules (e.g., executable code, object code, source code, script code, machine code, etc.) stored in the memory 120 to facilitate the operations described herein. The memory 120 may be any volatile or non-volatile computer-readable storage medium capable of storing data or computer code.

The memory 120 may include one or more of a request manager 122, a tunnel handler 124, a synthetic transactions manager 128, a metric database 130, a performance analyzer 132, and an exporter 134. The data processing system 110 may further include other components, managers, handlers, etc. to perform the techniques as described herein. In brief overview, the components 122-134 may receive a request to execute a synthetic transaction to determine a performance of a telecommunications device (e.g., the client device 106) accessing a service (e.g., the service 109). The components 122-134 may create a tunnel 104 between the data processing system 110 and the telecommunications device and transmit data packets to the telecommunications device via the tunnel 104. The components 122-134 may receive a response from the telecommunications device based on execution of the synthetic transaction. The components 122-134 may provide a notification indicating the performance of the synthetic transaction based on the response. In some cases, the components 122-134 may transmit signaling to configure the telecommunications device to accept the tunnel 104 and signaling to configure the telecommunications device to reject the tunnel 104 based on performing the synthetic transaction. In some embodiments, the components 122-134 may periodically (e.g., at set periods, intermittently, upon a trigger) execute the synthetic transaction.

In some cases, a service provider 108 may determine to perform a test (e.g., a diagnostic test) of performance of a service 109 for a client device 106. For example, a device (e.g., a user device) may submit an alert to the service provider 108. The alert may indicate reduced performance of the service 109 from the perspective of the user (e.g., audio of a video streaming service may be experiencing interference). The service provider 108 may determine to perform a test to identify a performance of the service 109 for the client device 106 associated with the user device (e.g., a CPE located at a residential or commercial location associated with the user device). The service provider 108 may transmit (e.g., send), to the data processing system 110 (e.g., a hardware or virtual agent, nPoint, point of presence (PoP)), a request to perform a synthetic transaction (e.g., the test) to determine the performance. In some cases, the service provider 108 may be configured to transmit the request periodically (e.g., regardless of receiving an alert).

The request manager 122 may comprise programmable instructions that, upon execution, cause the processor 118 to receive (e.g., obtain, collect) the request. For example, the request manager 122 may receive, from the service provider 108, a message indicating the request to execute the synthetic transaction. The request manager 122 may receive the request via an application programming interface provided by the data processing system. The request may include an internet protocol (IP) address of the client device 106, an indication of a type of synthetic transaction to perform, or both. For example, the request manager 122 may determine data comprising instructions for executing a test (e.g., a synthetic transaction) to simulate activity in connection with the service 109. The request manager 122 may determine the data based on the indication from the request or may access the data from the memory 120 in response to receiving the request.

The test (or test data) can refer to or include a data structure or data files corresponding to the test. The test can include, for example, a script or instructions regarding types of tests to perform, when to perform the test, and what transactions or activities to simulate for the test. The test data can indicate to perform the test based on a time interval (e.g., a pro-active test) or an event (e.g., a reactive test). For example, the time interval can indicate to perform the test at certain times of the day on certain days of the week or month. The time interval can indicate, for example, to perform a test every hour (or every 5 minutes, 10 minutes, 20 minutes, 30 minutes, 2 hours or other time interval), during the weekend (e.g., Saturdays and Sundays), or both. In some cases, the request can be from a user of the client device 106 or based on an alert from the client device 106. For example, the data processing system 110 can determine to conduct a test of the service 109 based on a schedule, trigger, event, or user instruction. Responsive to determining to conduct a test of the service, the data processing system 110 can send an instruction to the tunnel handler 124, the synthetic transaction manager 128, or both, to initiate execution of the test of the performance or availability of the service 109.

The tunnel handler 124 may comprise programmable instructions that, upon execution, cause the processor 118 to create a tunnel 104 between the data processing system 110 and the client device 106. For example, the service provider 108 may transmit a command to the client device 106 to configure the client device 106 to accept a request to create the tunnel 104. In some implementations, the service provider 108 may transmit the message to execute the synthetic transaction subsequent to transmission of the command. Responsive to configuring the client device 106 to accept the request, the tunnel handler 124 may transmit the request to the client device 106. In some cases, the command and the request may be included in a message to the client device 106.

In some examples, the tunnel 104 may be configured to encapsulate packets transmitted via the tunnel 104. For example, the tunnel 104 may be a virtual private network (VPN) tunnel, an internet protocol secure (IPSec) tunnel, a generic routing encapsulation (GRE) tunnel, or another encapsulation protocol that may configure data packets sent via the tunnel 104 to appear to originate from the client device 106. In some cases, the protocol may be a security protocol.

The synthetic transaction manager 128 may comprise programmable instructions that, upon execution, cause the processor 118 to execute the synthetic transaction (e.g., the test). For example, the synthetic transaction manager 128 may transmit, via the tunnel 104 and to the client device 106, one or more data packets. The data packets may imitate local traffic of the client device 106 accessing the service 109 via the network 105 (e.g., appear to originate from the client device 106). The data packets may be test traffic generated by the synthetic transaction manager 128 based on the test data. For example, the synthetic transaction manager 128 can access the test data to select a type of test to perform. The types of tests can be predetermined and stored in the test data in the memory 120 or accessed from a different data store via the network 105 or accessed via a peripheral device connected to the client device 106. In some cases, a user or operator of the data processing system 110 or client device 106 can select the type of test to perform from a set of tests stored in test data. The client device 106 may handle the data packets in a similar manner to local traffic and route the data packets to a destination associated with the service 109 via the network 105. The client device 106 may receive a response to the data packets (e.g., requested data associated with the service 109) and forward (e.g., transmit, send, tunnel) the response to the data processing system 110 via the tunnel 104.

The performance analyzer 132 may comprise programmable instructions that, upon execution, cause the processor 118 to analyze (e.g., calculate, determine) one or more metrics associated with the synthetic transaction to determine a performance of the synthetic transaction. The synthetic transaction manager may receive the response from the client device 106 and provide information associated with the response to the performance analyzer 132. The performance analyzer 132 may determine metrics (e.g., a round trip time (RTT), a quantity of TCP retransmissions, a quantity of timeouts, an error code, etc.) associated with the performance of the synthetic transaction based on the response.

For example, the performance analyzer 132 may determine a first RTT associated with transmission of the data packets from the data processing system 110 to the service 109 via the client device 106 (e.g., via the tunnel 104 and the network 105). The performance analyzer 132 may determine a second RTT associated with transmission of the data packets from the data processing system 110 to the client device 106 (e.g., via the tunnel 104). The performance analyzer 132 may generate a third RTT for the synthetic transaction by subtracting the second RTT from the first RTT. The performance analyzer 132 can subtract the second RTT in order to account for the tunnel 104 between the data processing system 110 and the client device 106 such that the performance metrics, such as RTT, are normalized and comparable to performance metrics collected from historic or other synthetic transactions conducted with the use of a local probe at the location instead of via a tunnel 104 by distributed agents, for example. The data processing system 110 can determine the second RTT to subtract based on metrics collected during the handshake process that established the tunnel 104.

In some cases, the performance analyzer 132 may establish a log file for the test. For example, the performance analyzer 132 may log (e.g., store) at least one of a packet trace file or a packet capture file for the data packets or the response (e.g., data packets received by the client device 106 from the service 109 in response to the data packets transmitted by the client device 106 to the service 109) in the memory 120. The log files may include information associated with the test. The information may include a test type identifier, a source IP address of the client device 106 conducting the test, a type of digital service 109, a time and date stamp for the test, or other information associated with the test. The performance analyzer 132 can create a unique identifier for the test and assign the unique identifier to the log file. For example, the performance analyzer 132 can generate the unique identifier based on one or more of the source IP address, test type identifier, or timestamp. If different tests are conducted, the performance analyzer 132 can create a new log file for each test so as to maintain data packets associated with different tests separately.

In some cases, the performance analyzer 132 may store the log files in the metric database 130. The metric database 130 may be a database (e.g., relational, non-relational, object oriented) that stores the metrics, an indication of the metrics, an identifier for the metrics associated with a synthetic transaction, and/or metadata associated with the synthetic transaction, among other potential data. In some cases, the performance analyzer 132 may store such data from multiple synthetic transactions between the client device 106 and services 109 (e.g., a same service 109, different services 109) with identifiers to distinguish between the synthetic transactions. In some examples, the performance analyzer 132 may store the data in memory instead of the metric database 130. The performance analyzer 132, the processor 118, and/or another component of the memory 120 may retrieve data from the metric database 130 for uses associated with performing remote synthetic transactions and determining client device operation.

Based on the analysis of the metrics, the performance analyzer 132 may determine the performance of the synthetic transaction. In a first example, the performance analyzer 132 may determine an error associated with the synthetic transaction. The error may indicate a problem associated with communications between the client device 106 and the service 109. In a second example, the performance analyzer 132 may determine normal operation (e.g., similar operation/metrics to a baseline operation/metrics) associated with the synthetic transaction. In some cases, responsive to completion of the synthetic transaction, the service provider 108 may provide (e.g., send, transfer, transmit) an instruction to configure the client device 106 to deny requests to create tunnels 104 at the client device 106. For example, the data processing system 110 may complete the synthetic transaction and determine to terminate the tunnel 104. The service provider 108 may configure the client device 106 to stop tunnel creation based on the termination of the tunnel 104 (e.g., for security), thereby preventing or precluding unintended or desired tunnels from being created. In a first example, the data processing system 110 may provide an instruction, to the service provider 108, to configure the client device 106 to deny requests to create tunnels at the client device 106. In a second example, the data processing system 110 may configure (e.g., transmit a configuration message) the client device 106 to deny requests to create tunnels. In a third example, the client device 106 may be configured to deny requests responsive to a threshold time interval (e.g., 5 minutes, 10 minutes, 15 minutes, 30 minutes, 1 hour, 2 hours) after initiating a tunnel (e.g., allowing time to conduct the synthetic transaction). In a fourth example, the client device 106 may be configured to deny requests responsive to detecting a termination of the tunnel established by the data processing system 110. By closing the tunnel 104, the client device 106 can avoid wasted computing, energy, or network resources associated with keeping a communication port open or checking for tunnel requests.

The exporter 134 may comprise executable instructions that, upon execution by the processor 118, may provide (e.g., export) a notification indicative of the performance of the execution of the synthetic transaction, a report associated with the synthetic transaction, a message including the metrics for one or more synthetic transactions, or any combination thereof (e.g., generated data), to the service providers 108. For example, the exporter 134 may create an exportable file (e.g., a file with a format such as BIL, GRD/TAB, PNG, ASKII, KMZ, etc.) from the generated data and transmit the exportable file to the service providers 108. The exporter 134 may transmit the exportable file to the service providers 108 responsive to a request from the service providers 108. In some embodiments, the exporter 134 may generate and/or export exportable files to the service providers 108 at set intervals to provide the service providers 108 with real-time updates of the performance of communication sessions between the client device 106 and services 109.

Figure 2:
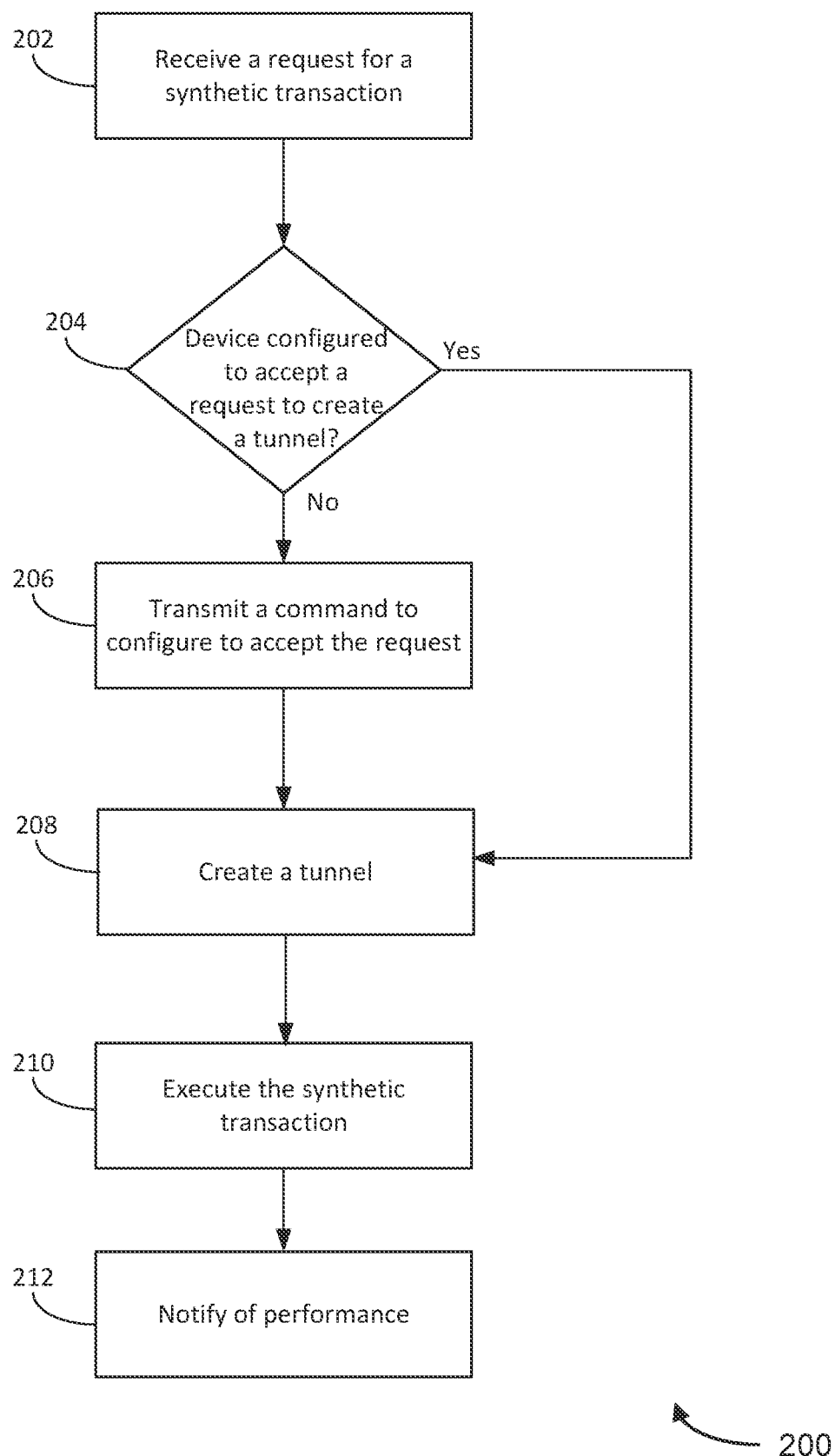
FIG. 2 is flow diagram of a process for remote synthetic transactions, in accordance with an implementation.

FIG. 2 is a flow diagram of a process 200 for remote synthetic transactions, in accordance with an implementation. The process 200 can be performed by a data processing system (the data processing system 110, shown and described with reference to FIG. 1). The process 200 may include more or fewer operations and the operations may be performed in any order. Performance of the process 200 may enable the data processing system to remotely perform a synthetic transaction between a client device and a service. The data processing system may be at a location other than a location of the client device. The data processing system may receive a request to perform the synthetic transaction and create a tunnel (e.g., the tunnel 104 shown and described with reference to FIG. 1) between the data processing system and the client device. The tunnel may allow data packets associated with the synthetic transaction to appear to originate from the client device. The metric of the synthetic transaction may indicate a performance of the synthetic transaction. The data processing system may determine the performance and provide an indication to a service provider (e.g., for troubleshooting).

At operation 202, the data processing system can receive a request. The request may be a request to execute a synthetic transaction to determine a performance with which a client device (e.g., CPE) access a service hosted by servers via a network. The data processing system may receive the request via an application programming interface. The request may include an IP address of the client device and a type of synthetic transaction to execute. The client device may be remote from the data processing system (e.g., at a location other than a location of the data processing system). The data processing system may receive the request from a service provider (e.g., an ISP). The service provider may send the request to the data processing system based on an alert (e.g., an event) submitted by a device (e.g., a user device, a mobile device, a wireless communication device) associated with the client device (e.g., serviced by the client device, in wireless communication with the client device), at set time intervals, or both. The alert may include a user request based on degraded performance with the service (e.g., disconnection with the service, interruptions while accessing the service, etc.).

At decision block 204, the data processing system can determine whether a tunnel can be created between the client device and the data processing system. For example, the client device may be configured to reject or accept a request to create a tunnel. The client device may be configured to reject or accept the request based on initial configurations (e.g., configurations by manufacturer), user configurations, configurations from the data processing system, or any combination thereof. Responsive to determining that the client device can accept the request to create a tunnel, the data processing system may perform operation 208. Responsive to determining that the client device is configured to reject the request, the data processing system may perform operation 206.

At operation 206, the service provider may transmit a command. The command may configure the client device to accept the request. The service provider may transmit the command to the client device subsequent to the request from the service provider to execute the synthetic transaction. The client device may receive the command and configure to accept the request to create the tunnel.

At operation 208, the data processing system can create a tunnel. The tunnel may be a tunnel between the data processing system and the client device. The tunnel may be configured according to a protocol (e.g., a security protocol, other protocols). For example, the tunnel may be a VPN tunnel, an IPSec tunnel, or a GRE tunnel. The command may include an indication of the protocol for the tunnel. The tunnel may be configured to encapsulate packets transmitted via the tunnel (e.g., such that traffic sent via the tunnel appears to originate from the client device). The data processing system may create the tunnel responsive to the alert, the request, and/or at set time intervals configured by a user of the client device, the service provider, or other operator.

At operation 210, the data processing system can execute the synthetic transaction. The synthetic transaction may include the data processing system executing the synthetic transaction by transmission of one or more data packets to the client device. The data packets may include data to imitate local traffic from a user device of the client device being sent to the service. The data processing system may encapsulate the data packets and transmit the data packets to the client device via the tunnel. The client device may handle the data packets as locally generated traffic (e.g., despite the data packets being generated remotely) and transmit the data packets to the service. The service may handle the data packets as traffic from the client device (e.g., as if a user was sending the data packets, as if not part of a test), and service the data packets with a response. The service may send the response to the client device. The client device may send the response to the data processing system via the tunnel.

The data processing system can determine (e.g., track, calculate, log) metrics associated with the synthetic transaction. The metrics may include one or more RTTs, a quantity of TCP retransmissions, a quantity of timeouts, or an error code, among other metrics to determine performance of the synthetic transaction. The data processing system may calculate an RTT based on subtracting a first RTT of time of transmission between the data processing system and the service from a second RTT of time of transmission between the data processing system and the client device.

At operation 212, the data processing system can notify of (e.g., provide) a performance. The performance may include an indication of a performance of the synthetic transaction, a baseline performance of other synthetic transactions for the client device, a baseline performance of the client device servicing calls between the user device and the service (e.g., history of performance during "normal" operation), one or more metrics of the synthetic transaction, or multiple metrics and/or performance associated with multiple synthetic transactions, among other indicators. The data processing system may provide the indication to the service providers. The data processing system may provide the indication to the service providers responsive to a request from the service providers. The data processing system may terminate the tunnel. The service provider can send a command to the client device to configure the client device to reject tunnel creation requests.

Figure 3:
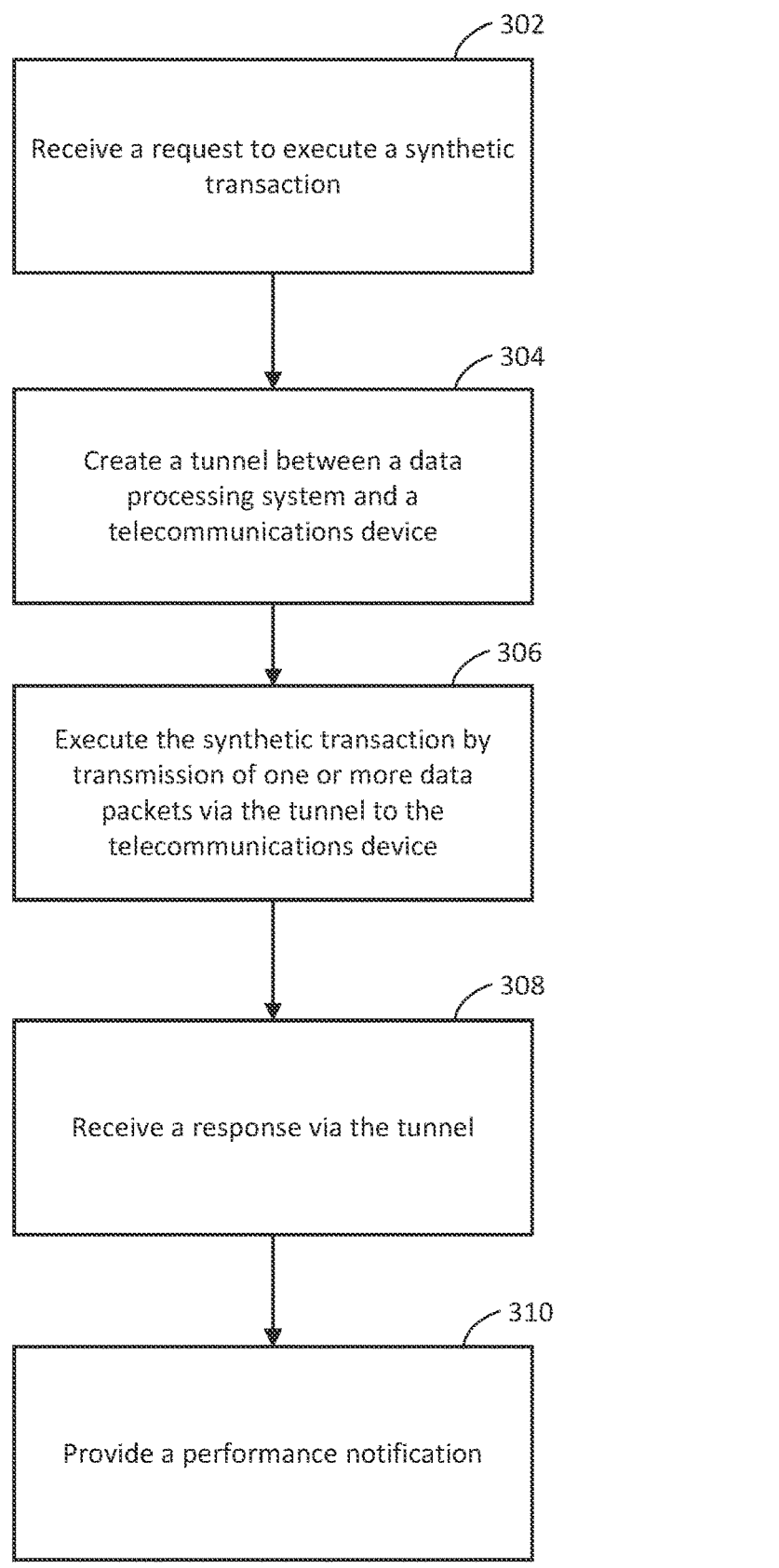
FIG. 3 is a method for remote synthetic transactions, in accordance with an implementation.

FIG. 3 is a method 300 for remote synthetic transactions, in accordance with an implementation. The method 300 can be performed by one or more system, component or module depicted in FIG. 1, 4, 5, 6A, 6B, or 6C, including, for example, a data processing system or service of a cloud service provider system. The method 300 may include more or fewer operations and the operations may be performed in any order. At ACT 302, the data processing system can receive a request to execute a synthetic transaction. The data processing system can receive the request from a service provider responsive to an alert from a device associated with a client device. The data processing system can receive the request subsequent to transmission of a command to the client device to configure the client device to accept a request to create a tunnel.

At operation 304, the data processing system can create a tunnel between the data processing system and the client device. The tunnel may be a VPN tunnel, an IPSec tunnel, or a GRE tunnel. The data processing system may be at a location other than a location of the client device. The tunnel may allow the data processing system to execute synthetic transactions remotely from the client device (e.g., rather than at the location of the client device or near to the client device).

At operation 306, the data processing system can execute the synthetic transaction by transmission of one or more data packets to the client device. The one or more data packets may be encapsulated to be transmitted via the tunnel to the client device with a security protocol. The data packets may include traffic for a service as part of the synthetic transaction.

At operation 308, the data processing system can receive a response via the tunnel. For example, the client device may transmit the data packets to the service via a network. The service may respond to the data packets with a response and transmit the response to the client device via the network different from the tunnel. The client device may forward the response to the data processing system via the tunnel.

At operation 310, the data processing system can provide a performance notification. The performance notification may be indicative of the performance of the execution of the synthetic transaction. For example, the performance may indicate one or more metrics associated with the synthetic transaction (e.g., RTT, a number of TCP retransmissions, a number of timeouts, an error code). The data processing system can provide the performance notification to the system provider, the client device, or a user of the client device, among other entities.

Figure 4:
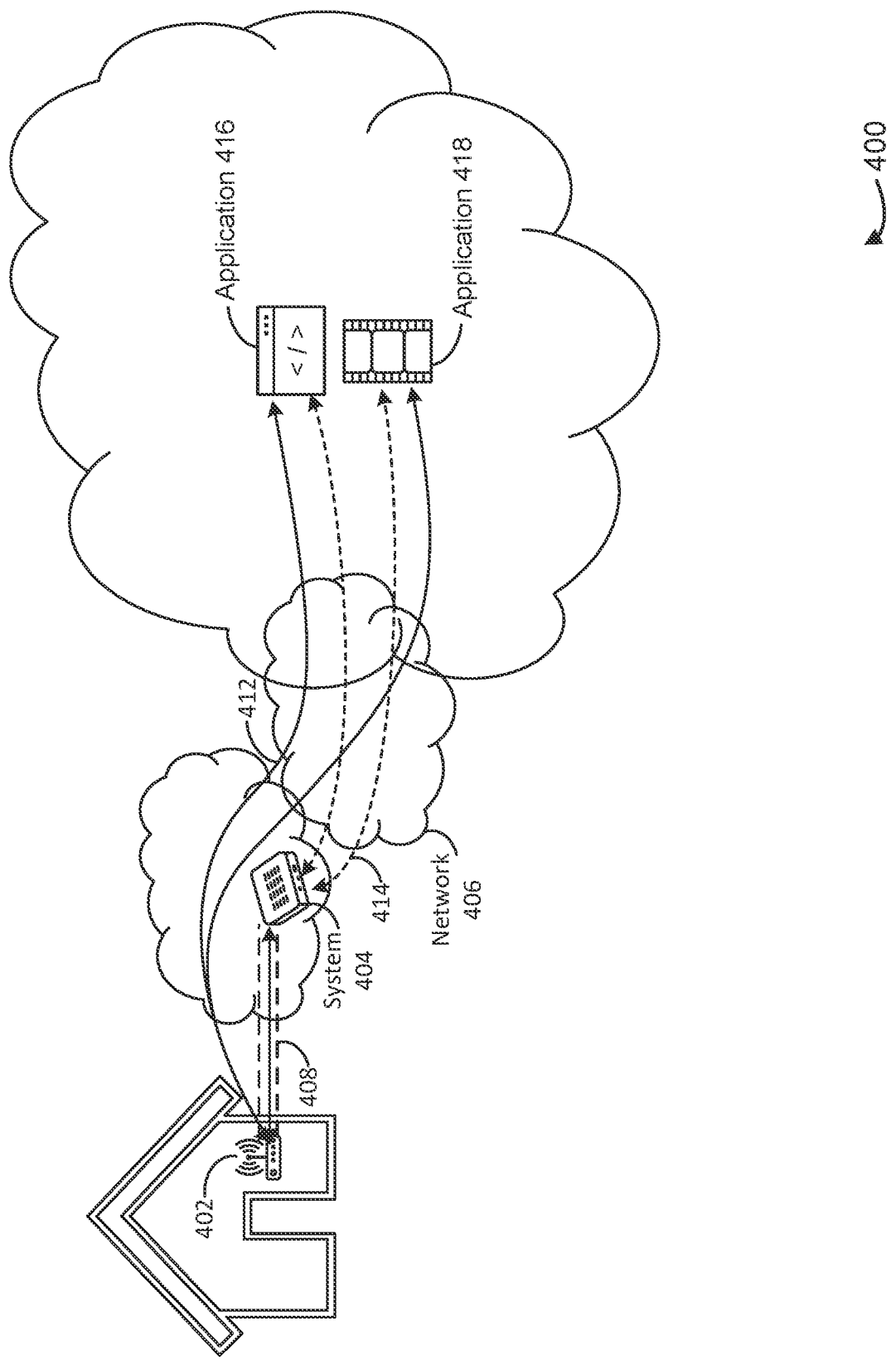
FIG. 4 is an illustration of a system for remote synthetic transactions, in accordance with an implementation.

FIG. 4 is an illustration of a system 400 for remote synthetic transactions, in accordance with an implementation. The system 400 may include a client device 402 (e.g., a CPE), a data processing system 404 (e.g., a node, an agent, a PoP, an nPoint, an agent within a service provider PoP site), and a network 406. The client device 402, the data processing system 404, and the network 406 may be in wireless communication with each other. For example, the client device 402 may access applications 416 and 418 (e.g., a service, an online video streaming service, an online electronic marketplace or e-commerce provider) via the network 406 (e.g., via connections 412). In some cases, the client device 402 accessing one of the applications 416 and 418 may be a communication session. The client device may be located at a residential location.

In some cases, a user may operate a user device (e.g., a phone, a laptop, a TV, other device) to access the application 416 via the client device 402. The client device 402 can include one or more component or functionality of the client device 106 depicted in FIG. 1. The user device may experience one or more network issues (e.g., connection issues, network errors, degraded performance). The user and/or the user device may alert a service provider of the applications 416 and 418 about the issues. The service provider may determine to perform a series of tests from the site of the user device to aid in troubleshooting (e.g., to determine the problem, what issues are occurring). However, to perform the series of tests from the site, the service provider may send an engineer to the site, or the service provider may not perform the tests and instead replace the client device 402 with a new device. The techniques provided herein may result in advantages over the described deficiencies.

The data processing system 404 can include one or more component or functionality of the data processing system 110 depicted in FIG. 1. In some examples, the data processing system 404 may perform synthetic transactions (e.g., a series of tests, a diagnostic test) at a remote location (e.g., a location other than a location of the client device 402) to determine a performance of a client device 402 accessing applications (e.g., applications 416 and 418) via the network 406. To do so, the data processing system 404 may create a tunnel 408 between the client device 402 and the data processing system 404 responsive to receiving a request to execute the synthetic transaction via a connection 414, at a set time interval, or both. The tunnel 408 may be a VPN tunnel, an IPSec tunnel, or a GRE tunnel. To create the tunnel, the service provider may transmit a command to the client device 402 to configure the client device 402 to accept a request to create the tunnel 408.

The data processing system 404 may execute the synthetic transactions by transmitting data packets to the client device 402 via the tunnel 408. The synthetic transactions may include tests, such as tests to google.com, bbc.co.uk, a VoIP call, a video conference, a movie download test, to the applications 416 and/or 418, among other tests. The data processing system 404 may receive a response from the client device 402 based on the tests via the tunnel 408. The data processing system 404 may determine one or more metrics of the synthetic transaction based on the response. The metrics may indicate a performance of the synthetic transaction, which may result in a higher quality troubleshooting session for the service provider.

Figure 5:
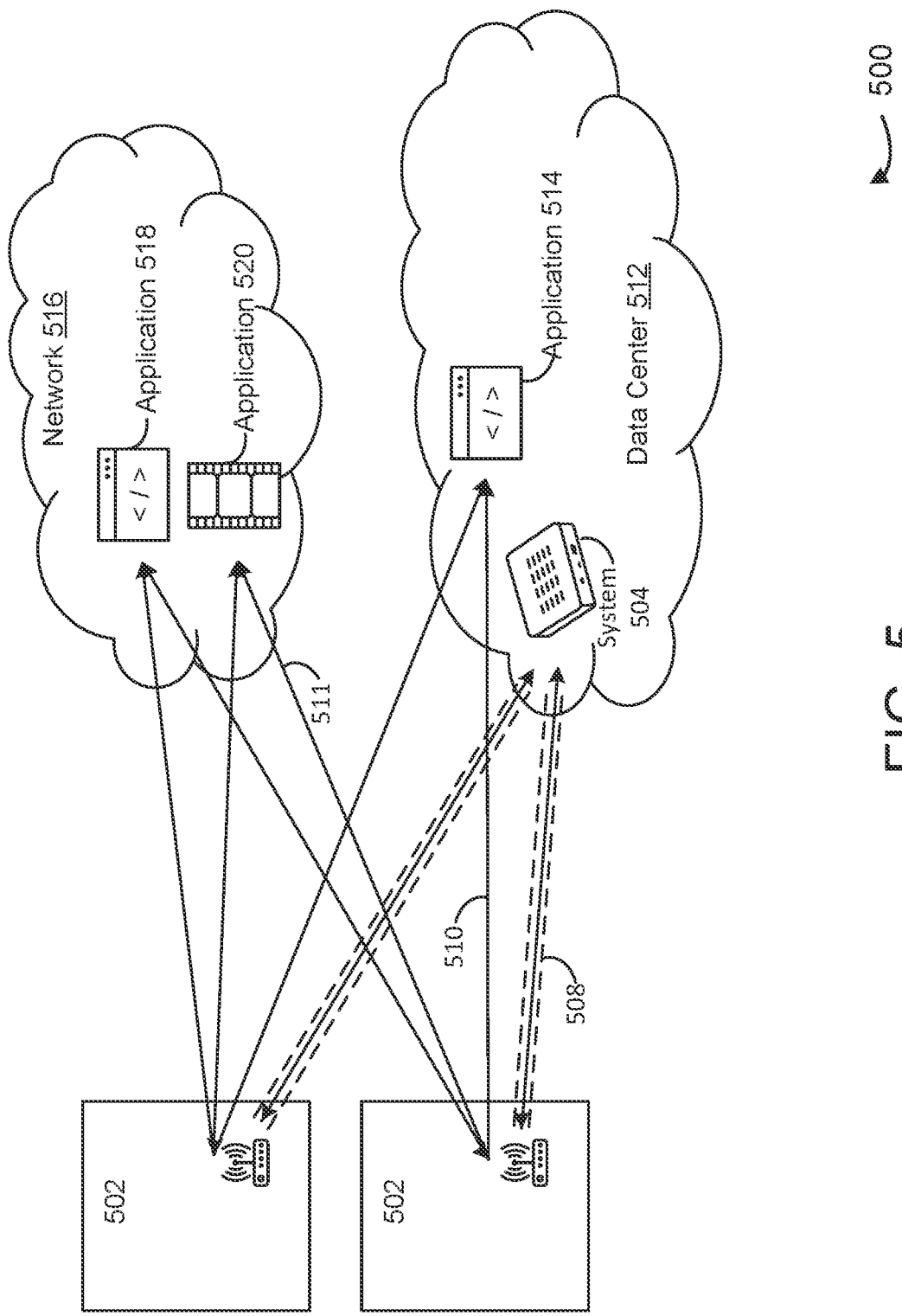
FIG. 5 is an illustration of a system for remote synthetic transactions, in accordance with an implementation.

FIG. 5 is an illustration of a system 500 for remote synthetic transactions, in accordance with an implementation. The system 500 may include remote sites 502 (e.g., a site including one or more client devices), a data processing system 504 (e.g., a node, an agent, a PoP, an nPoint, an agent within a service provider PoP site), a data center 512, and a network 516. The data center 512 may service an application 514 (e.g., an internal app) and the network 516 may service applications 518 and 520 (e.g., Office 365, Zoom, etc.). For example, the remote sites 502 may be commercial locations (e.g., remote branches) for an organization accessing the internal application 514 and the external applications 518, and 520.

In some cases, some organizations may include remote branches (e.g., remote sites 502) that support a software defined wide area network (SD-WAN) environment. Thus, the remote sites 502 may support an internet connection locally and network traffic being either split to the internet (e.g., network 516) or tunneled back to the data center 512 (e.g., an internal network of the organization). The organization may differentiate corporate software as a service (SaaS) resources (e.g., Office365, Microsoft Teams, Zoom, Webex, Salesforce) and route the SaaS resources to and from the network 516 while other traffic (e.g., traffic for the application 514) is sent to the data center 512 (e.g., similar to when WAN is via a co-lo provider).

In some cases, a user may operate a user device (e.g., a phone, a laptop, a TV, other device) at a remote site 502 to access one or more of the applications 514, 518, and 520 via a client device. The user device may experience one or more network issues (e.g., connection issues, network errors, degraded performance). The user and/or the user device may alert a service provider of the applications 518 and 520 and/or the organization (e.g., an information systems technician (IT) group) about the issues. The service provider and/or the organization may determine to perform a series of tests from the site of the user device to aid in troubleshooting (e.g., to determine the problem, what issues are occurring). However, to perform the series of tests from the site, the service provider and/or organization may send an engineer to the site, or the service provider and/or organization may not perform the tests and instead replace the client device with a new device. The techniques provided herein may result in advantages over the described deficiencies. For example, the IT group may perform a test remotely to test both internet bound traffic (e.g., via connections 511 for the network 516) and internal connections (e.g., connections 510 for the data center 512), which may result in higher quality troubleshooting sessions (e.g., an ability to determine changes and issues originating from the remote site 502 without sending dedicated hardware or installing dedicated software).

In some examples, the data processing system 504 may perform synthetic transactions (e.g., the series of tests, a diagnostic test) at a remote location (e.g., a location other than the remote site 502) to determine a performance of a client device accessing applications (e.g., applications 514, 518, and 520) via the network 516 and the data center 512. To do so, the data processing system 504 may create a tunnel 508 between the client device and the data processing system 504 responsive to receiving a request to execute the synthetic transaction via a connection 510 or 511, at a set time interval, or both. The tunnel 508 may be a VPN tunnel, an IPSec tunnel, or a GRE tunnel. To create the tunnel, the service provider may transmit a command to the client device to configure the client device to accept a request to create the tunnel 508.

The data processing system 504 may execute the synthetic transactions by transmitting data packets to the client device via the tunnel 508. The synthetic transactions may include tests to the applications 514, 518, and/or 520. The data processing system 504 may receive a response from the client device based on the tests via the tunnel 508. The data processing system 504 may determine one or more metrics of the synthetic transaction based on the response. The metrics may indicate a performance of the synthetic transaction, which may result in a higher quality troubleshooting session for the service provider and/or organization.

FIG. 6A depicts an example network environment that can be used in connection with the methods and systems described herein. In brief overview, the network environment 600 includes one or more client devices 106 (also generally referred to as clients, client node, client machines, client computers, client computing devices, endpoints, or endpoint nodes) in communication with one or more servers 602 (also generally referred to as servers, nodes, or remote machine) via one or more networks 105. In some embodiments, a client 106 has the capacity to function as both a client node seeking access to resources provided by a server and as a server providing access to hosted resources for other client devices 106.

Although FIG. 6A shows a network 105 between the client devices 106 and the servers 602, the client devices 106 and the servers 602 can be on the same network 105. In embodiments, there are multiple networks 105 between the client devices 106 and the servers 602. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g. Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 600 can include multiple, logically grouped servers 602. The logical group of servers can be referred to as a data center 608 (or server farm or machine farm). In embodiments, the servers 602 can be geographically dispersed. The data center 608 can be administered as a single entity or different entities. The data center 608 can include multiple data centers 608 that can be geographically dispersed. The servers 602 within each data center 608 can be homogeneous or heterogeneous (e.g., one or more of the servers 602 or machines 604 can operate according to one type of operating system platform (e.g., WINDOWS NT, manufactured by Microsoft Corp. of Redmond, Washington), while one or more of the other servers 602 can operate on according to another type of operating system platform (e.g., Unix, Linux, or Mac OS X)). The servers 602 of each data center 608 do not need to be physically proximate to another server 602 in the same machine farm 608. Thus, the group of servers 602 logically grouped as a data center 608 can be interconnected using a network. Management of the data center 608 can be de-centralized. For example, one or more servers 602 can comprise components, subsystems and modules to support one or more management services for the data center 608.

Server 602 can be a file server, application server, web server, proxy server, appliance, network appliance, gateway, gateway server, virtualization server, deployment server, SSL VPN server, or firewall. In embodiments, the server 602 can be referred to as a remote machine or a node. Multiple nodes can be in the path between any two communicating servers.

Figure 6B:
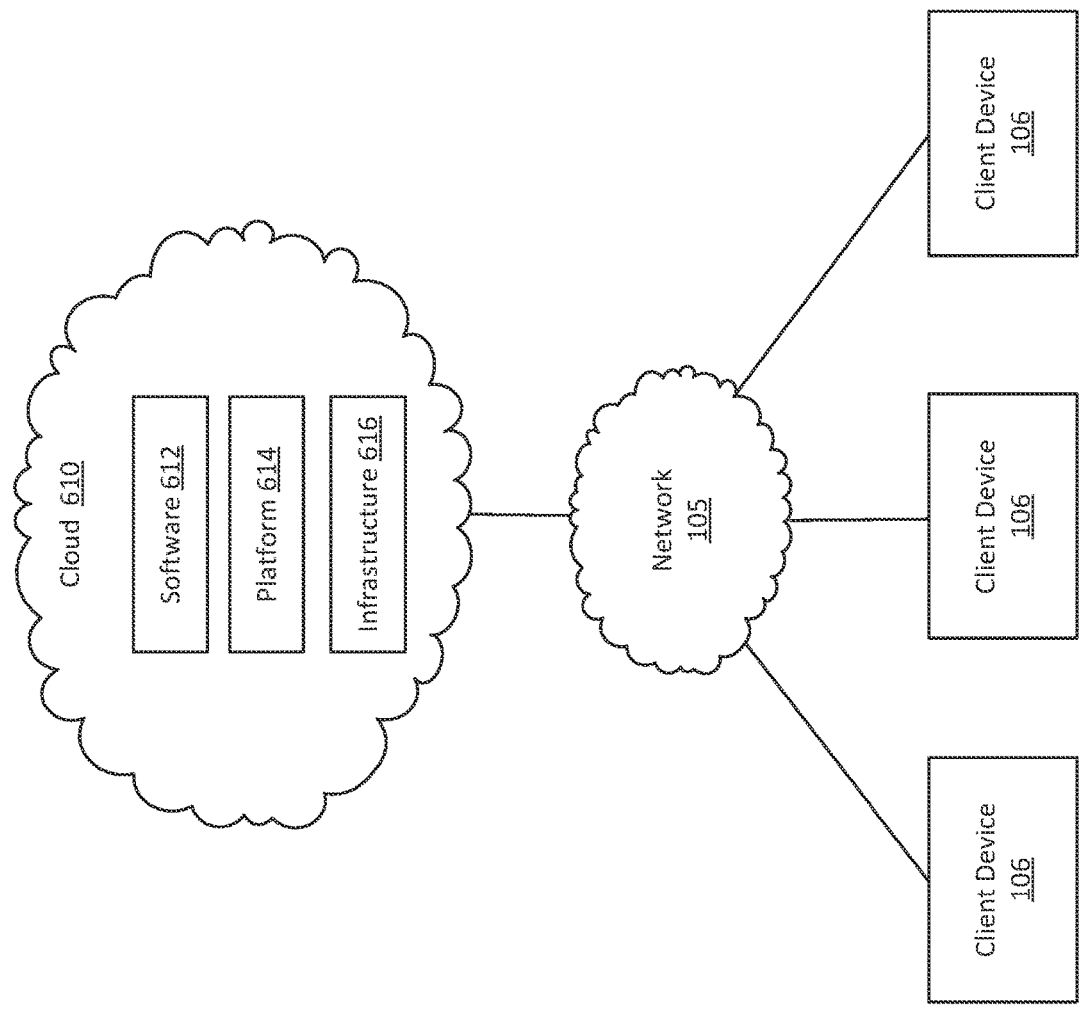
FIG. 6B is a block diagram depicting a cloud computing environment including a client device in communication with cloud service providers.

FIG. 6B illustrates an example cloud computing environment. A cloud computing environment 601 can provide client 106 with one or more resources provided by a network environment. The cloud computing environment 601 can include one or more client devices 106, in communication with the cloud 610 over one or more networks 105. Client devices 106 can include, e.g., thick clients, thin clients, and zero clients. A thick client can provide at least some functionality even when disconnected from the cloud 610 or servers 602. A thin client or a zero client can depend on the connection to the cloud 610 or server 602 to provide functionality. A zero client can depend on the cloud 610 or other networks 105 or servers 602 to retrieve operating system data for the client device. The cloud 610 can include back end platforms, e.g., servers 602, storage, server farms or data centers.

The cloud 610 can be public, private, or hybrid. Public clouds can include public servers 602 that are maintained by third parties to the client devices 106 or the owners of the clients. The servers 602 can be located off-site in remote geographical locations as disclosed above or otherwise. Public clouds can be connected to the servers 602 over a public network. Private clouds can include private servers 602 that are physically maintained by client devices 106 or owners of clients. Private clouds can be connected to the servers 602 over a private network 105. Hybrid clouds 608 can include both the private and public networks 105 and servers 602.

The cloud 610 can also include a cloud-based delivery, e.g. Software as a Service (SaaS) 612, Platform as a Service (PaaS) 614, and the Infrastructure as a Service (IaaS) 616. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 106 and server 602 can be deployed as and/or executed on any type and form of computing device, e.g. a computer, network device or appliance capable of communicating on any type and form of network and performing the operations described herein.

Figure 6C:
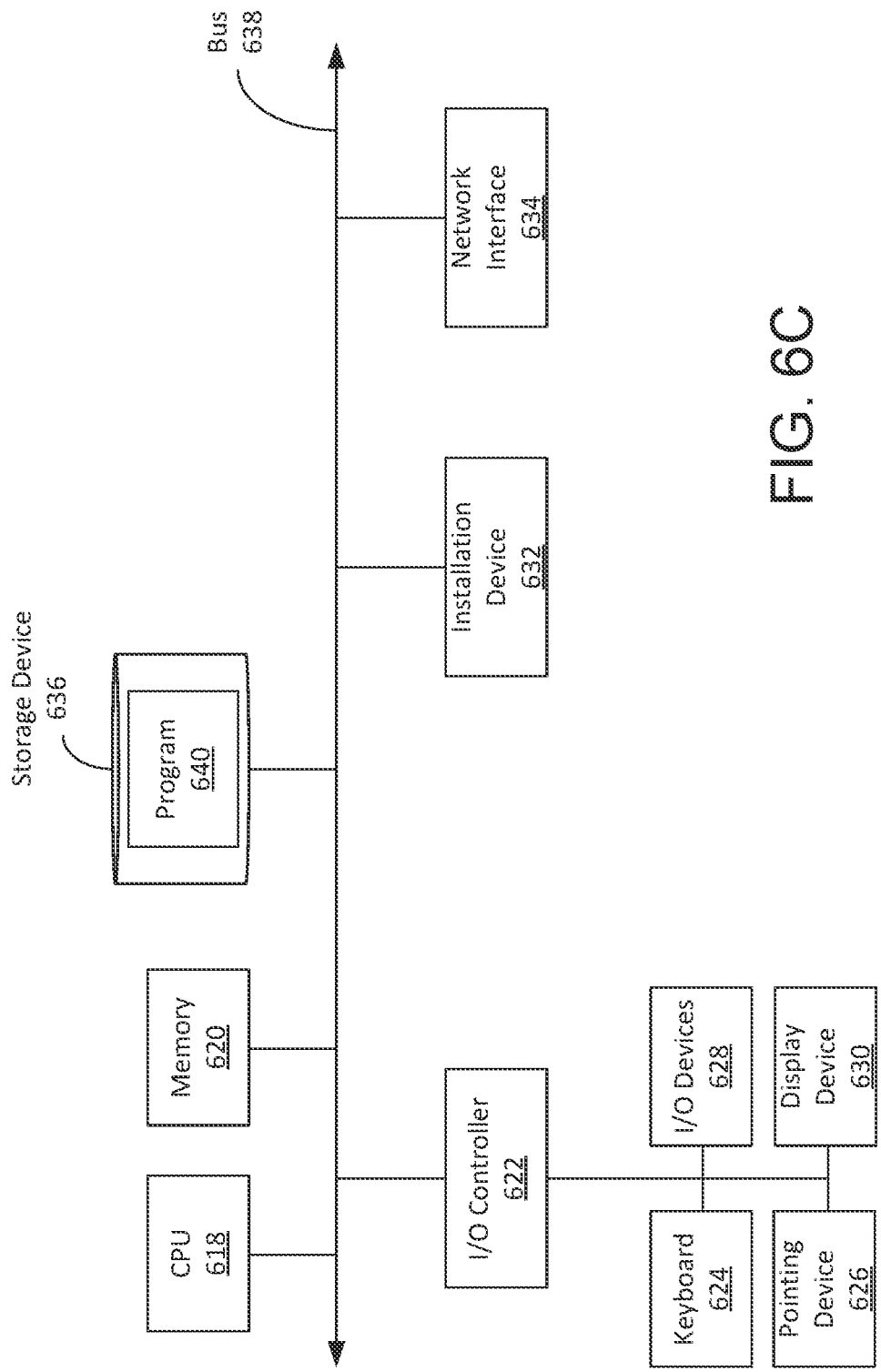
FIG. 6C is a block diagram depicting an implementation of a computing device that can be used in connection with the systems depicted in FIGS. 1, 4, and 5, and the methods depicted in FIGS. 2 and 3.

FIG. 6C depicts block diagrams of a computing device 604 useful for practicing an embodiment of the client 106 or a server 602. As shown in FIG. 6C, each computing device 604 can include a central processing unit 618, and a main memory unit 620. As shown in FIG. 6C, a computing device 604 can include one or more of a storage device 636, an installation device 632, a network interface 634, an I/O controller 622, a display device 630, a keyboard 624 or a pointing device 626, e.g. a mouse. The storage device 636 can include, without limitation, a program 640, such as an operating system, software, or software associated with system 100.

The central processing unit 618 is any logic circuitry that responds to and processes instructions fetched from the main memory unit 620. The central processing unit 618 can be provided by a microprocessor unit, e.g.: those manufactured by Intel Corporation of Mountain View, California. The computing device 604 can be based on any of these processors, or any other processor capable of operating as described herein. The central processing unit 618 can utilize instruction level parallelism, thread level parallelism, different levels of cache, and multi-core processors. A multi-core processor can include two or more processing units on a single computing component.

Main memory unit 620 can include one or more memory chips capable of storing data and allowing any storage location to be directly accessed by the microprocessor 618. Main memory unit 620 can be volatile and faster than storage 636 memory. Main memory units 620 can be Dynamic random access memory (DRAM) or any variants, including static random access memory (SRAM). The memory 620 or the storage 636 can be non-volatile; e.g., non-volatile read access memory (NVRAM). The memory 620 can be based on any type of memory chip, or any other available memory chips. In the example depicted in FIG. 6C, the processor 618 can communicate with memory 620 via a system bus 638.

A wide variety of I/O devices 628 can be present in the computing device 604. Input devices 628 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 628 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 628, display devices 630 or group of devices can be augmented reality devices. The I/O devices can be controlled by an I/O controller 622 as shown in FIG. 6C. The I/O controller 622 can control one or more I/O devices, such as, e.g., a keyboard 624 and a pointing device 626, e.g., a mouse or optical pen. Furthermore, an I/O device can also provide storage and/or an installation device 632 for the computing device 604. In embodiments, the computing device 604 can provide USB connections (not shown) to receive handheld USB storage devices. In embodiments, an I/O device 628 can be a bridge between the system bus 638 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 630 can be connected to I/O controller 622. Display devices can include, e.g., liquid crystal displays (LCD), electronic papers (e-ink) displays, flexile displays, light emitting diode displays (LED), or other types of displays. In some embodiments, display devices 630 or the corresponding I/O controllers 622 can be controlled through or have hardware support for OPENGL or DIRECTX API or other graphics libraries. Any of the I/O devices 628 and/or the I/O controller 622 can include any type and/or form of suitable hardware, software, or combination of hardware and software to support, enable or provide for the connection and use of one or more display devices 630 by the computing device 604. For example, the computing device 604 can include any type and/or form of video adapter, video card, driver, and/or library to interface, communicate, connect or otherwise use the display devices 630. In embodiments, a video adapter can include multiple connectors to interface to multiple display devices 630.

The computing device 604 can include a storage device 636 (e.g., one or more hard disk drives or redundant arrays of independent disks) for storing an operating system or other related software, and for storing application software programs 640 such as any program related to the systems, methods, components, modules, elements, or functions depicted in FIG. 1, or 2. Examples of storage device 636 include, e.g., hard disk drive (HDD); optical drive including CD drive, DVD drive, or BLU-RAY drive; solid-state drive (SSD); USB flash drive; or any other device suitable for storing data. Storage devices 636 can include multiple volatile and non-volatile memories, including, e.g., solid state hybrid drives that combine hard disks with solid state cache. Storage devices 636 can be non-volatile, mutable, or read-only. Storage devices 636 can be internal and connect to the computing device 604 via a bus 638. Storage device 636 can be external and connect to the computing device 604 via an I/O device 630 that provides an external bus. Storage device 636 can connect to the computing device 604 via the network interface 634 over a network 105. Some client devices 106 may not require a non-volatile storage device 636 and can be thin clients or zero client devices 106. Some storage devices 636 can be used as an installation device 632 and can be suitable for installing software and programs.

The computing device 604 can include a network interface 634 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 604 can communicate with other computing devices 604 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 634 can include a built-in network adapter, network interface card, PCMCIA network card, EXPRESSCARD network card, card bus network adapter, wireless network adapter, USB network adapter, modem or any other device suitable for interfacing the computing device 604 to any type of network capable of communication and performing the operations described herein.

A computing device 604 of the sort depicted in FIG. 6C can operate under the control of an operating system, which controls scheduling of tasks and access to system resources. The computing device 604 can be running any operating system configured for any type of computing device, including, for example, a desktop operating system, a mobile device operating system, a tablet operating system, or a smartphone operating system.

The computing device 604 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 604 has sufficient processor power and memory capacity to perform the operations described herein. In some embodiments, the computing device 604 can have different processors, operating systems, and input devices consistent with the device.

In embodiments, the status of one or more machines (e.g., 106 or 602) in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 604 in response to the CPU 618 executing an arrangement of instructions contained in main memory 620. Such instructions can be read into main memory 620 from another computer-readable medium, such as the storage device 636. Execution of the arrangement of instructions contained in main memory 620 causes the computing device 604 to perform the illustrative processes described herein. One or more processors in a multi-processing arrangement may also be employed to execute the instructions contained in main memory 620. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

The description relates to a network monitoring system that may implement an anomaly detection method for time series data associated with communication sessions. A threshold-based method may utilize a manual trial and error process that may be highly time consumptive due to the manual nature of the method. It may also have difficulty in adapting to data pattern changes as readjustments of the thresholds for detecting anomalies may only occur after either too many or too few anomalies are detected. A statistic-based method may utilize large amounts of historical data to calculate a normal distribution of communication session data. This method may be difficult to implement due to the necessity of large amounts of historical data and may not be applicable to time series data due to the assumption of normal distribution, which is not usually accurate for seasonal data.

A computer implementing the systems and methods described herein may overcome the aforementioned technical deficiencies. For example, the computer implementing the techniques described herein may provide an automated and scalable system for detecting anomalies in large (e.g., unlimited based on computational power) quantities of time series data. The techniques may include the computer operating to select a machine learning model for generating forecast data. To do so, the computer may generate clusters of sets of time series data by applying one or more clustering algorithms. The computer may operate to evaluate different machine learning models for each of the clusters using a center of the time series data of each cluster. The computer may then select a respective machine learning model for each cluster based on an output that satisfies an accuracy threshold.

At least one aspect of a technical solution to the aforementioned problem is directed to a method. The method may comprise obtaining, by a processor, a plurality of sets of time series data; generating, by the processor, a cluster of two or more of the plurality of sets of time series data based on a similarity between each of the two or more sets of time series data; determining, by the processor, a first set of time series data as a center of the cluster; executing, by the processor using the first set of time series data as input, a first machine learning model to generate a first time series output; and responsive to determining the first time series output of the first machine learning model satisfies a threshold, executing, by the processor, the first machine learning model using a second set of time series data as input to generate a second time series output.

At least one aspect of this technical solution is directed to a system. The system may comprise a processor. The processor may obtain a plurality of sets of time series data; generate a cluster of two or more of the plurality of sets of time series data based on a similarity between each of the two or more sets of time series data; determine a first set of time series data as a center of the cluster; execute, using the first set of time series data as input, a first machine learning model to generate a first time series output; and execute the first machine learning model using a second set of time series data as input to generate a second time series output based on determining the first time series output of the first machine learning model satisfies a threshold.

At least one aspect of this technical solution is directed to a non-transitory computer-readable storage medium storing executable instructions that, when executed by a processor, cause the processor to obtain a plurality of sets of time series data; generate a cluster of two or more of the plurality of sets of time series data based on a similarity between each of the two or more sets of time series data; determine a first set of time series data as a center of the cluster; execute, using the first set of time series data as input, a first machine learning model to generate a first time series output; and execute the first machine learning model using a second set of time series data as input to generate a second time series output based on determining the first time series output of the first machine learning model satisfies a threshold.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output.

The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system, comprising:
a data processing system comprising one or more processors, coupled with memory, to:
   receive a request to execute a synthetic transaction to simulate one or more actions of a telecommunications device to access a service hosted by one or more servers via a network, wherein the telecommunications device is at a location which is remote from the data processing system;
   create, responsive to receipt of the request to execute the synthetic transaction, a tunnel between the data processing system and the telecommunications device, the tunnel configured to encapsulate packets transmitted between the data processing system and the telecommunications device via the tunnel;
   execute, responsive to creation of the tunnel, the synthetic transaction by transmission of one or more first data packets via the tunnel to the telecommunications device to cause the telecommunications device to receive one or more second data packets from the service, wherein the one or more first data packets are configured to indicate the location of the telecommunications device as a source of the one or more first data packets;
   receive, responsive to execution of the synthetic transaction to access the service, a response from the telecommunications device via the tunnel, the response including information associated with transmission of the one or more second data packets from the service to the telecommunications device; and
   provide, based on the response received via the tunnel, a notification indicative of a performance of the service.

2. The system of claim 1, comprising:
the data processing system to transmit a command to the telecommunications device to accept a request to create the tunnel from the data processing system responsive to receipt by the telecommunications device of a command from a network service provider to configure the telecommunications device to accept requests to create tunnels from the data processing system.

3. The system of claim 1, wherein the tunnel comprises at least one of a virtual private network ("VPN") tunnel, an Internet protocol secure ("IPSec") tunnel, or a generic routing encapsulation ("GRE") tunnel.

4. The system of claim 1, comprising:
the data processing system to create the tunnel responsive to an alert submitted by a device associated with the telecommunications device.

5. The system of claim 1, comprising:
the data processing system to receive the request to execute the synthetic transaction from a service provider that manages the telecommunications device, wherein the service provider transmits the request to execute the synthetic transaction subsequent to transmission of a command to the telecommunications device to configure the telecommunications device to accept a request to create the tunnel from the data processing system.

6. The system of claim 1, comprising:
the data processing system to receive the request via an application programming interface provided by the data processing system, the request comprising an Internet protocol ("IP") address of the telecommunications device and a type of synthetic transaction to execute.

7. The system of claim 1, comprising:
the data processing system to log, for the synthetic transaction, at least one of a packet trace file or a packet capture file for one or more packets transmitted from the telecommunications device to the service or received by the telecommunications device from the service.

8. The system of claim 1, comprising the data processing system to:
determine a metric associated with the performance of the synthetic transaction, the metric comprising at least one of a round trip time, a number of TCP retransmissions, a number of timeouts, or an error code.

9. The system of claim 1, comprising the data processing system to:
determine a first round trip time associated with execution of the synthetic transaction from the data processing system to the service via the telecommunications device;

determine a second round trip time associated with packets transmitted from the data processing system to the telecommunications device via the tunnel; and
subtract the second round trip time from the first round trip time to generate a third round trip time for the synthetic transaction.

10. The system of claim 1, comprising the data processing system to:
provide, subsequent to completion of the synthetic transaction, an instruction to configure the telecommunications device to deny requests to create tunnels at the telecommunications device.

11. A method performed by a data processing system comprising one or more processors coupled with memory, the method comprising:
receiving a request to execute a synthetic transaction to simulate one or more actions of a telecommunications device to access a service hosted by one or more servers via a network, wherein the telecommunications device is at a location which is remote from the data processing system;
creating, responsive to receiving the request to execute the synthetic transaction, a tunnel between the data processing system and the telecommunications device, the tunnel configured to encapsulate packets transmitted between the data processing system and the telecommunications device via the tunnel with a security protocol;
executing, responsive to creating the tunnel, the synthetic transaction by transmission of one or more first data packets via the tunnel to the telecommunications device to cause the telecommunications device to receive one or more second data packets from the service, wherein the one or more first data packets are configured to indicate the location of the telecommunications device as a source of the one or more first data packets;
receiving, responsive to executing the synthetic transaction to access the service, a response from the telecommunications device via the tunnel, the response including information associated with transmission of the one or more second data packets from the service to the telecommunications device; and
providing, based on the response received via the tunnel, a notification indicative of a performance of the service.

12. The method of claim 11, comprising:
transmitting a command to the telecommunications device to accept a request to create the tunnel from the data processing system responsive to receipt by the telecommunications device of a command from a network service provider to configure the telecommunications device to accept requests to create tunnels from the data processing system.

13. The method of claim 11, wherein the tunnel comprises at least one of a virtual private network ("VPN") tunnel, an Internet protocol secure ("IPSec") tunnel, or a generic routing encapsulation ("GRE") tunnel.

14. The method of claim 11, comprising:
creating the tunnel responsive to an alert submitted by a device associated with the telecommunications device.

15. The method of claim 11, comprising:
receiving the request to execute the synthetic transaction from a service provider that manages the telecommunications device, wherein the service provider transmits the request to execute the synthetic transaction subsequent to transmission of a command to the telecommunications device to configure the telecommunications device to accept a request to create the tunnel from the data processing system.

16. The method of claim 11, comprising:
receiving the request via an application programming interface provided by the data processing system, the request comprising an Internet protocol ("IP") address of the telecommunications device and a type of synthetic transaction to execute.

17. The method of claim 11, comprising:
determining a metric associated with the performance of the synthetic transaction, the metric comprising at least one of a round trip time, a number of TCP retransmissions, a number of timeouts, or an error code.

18. The method of claim 11, comprising:
providing subsequent to completion of the synthetic transaction, an instruction to configure the telecommunications device to deny requests to create tunnels at the telecommunications device.

19. A non-transitory computer readable medium storing processor-executable instructions that, when executed by one or more processors, cause the one or more processors to:
receive a request to execute a synthetic transaction to simulate one or more actions of a telecommunications device to access a service hosted by one or more servers via a network, wherein the telecommunications device is at a location which is remote from the one or more processors;
create, responsive to receipt of the request to execute the synthetic transaction, a tunnel between a network interface coupled with the one or more processors and the telecommunications device, the tunnel configured to encapsulate packets transmitted the one or more processors and the telecommunications device via the tunnel with a security protocol;
execute, responsive to creation of the tunnel, the synthetic transaction by transmission of one or more first data packets via the tunnel to the telecommunications device to cause the telecommunications device to receive one or more second data packets from the service, wherein the one or more first data packets are configured to indicate the location of the telecommunications device as a source of the one or more first data packets;
receive, responsive to execution of the synthetic transaction to access the service, a response from the telecommunications device via the tunnel, the response including information associated with transmission of the one or more second data packets from the service to the telecommunications device; and
provide, based on the response received via the tunnel, a notification indicative of a performance of the service.

20. The non-transitory computer readable medium of claim 19, wherein the processor-executable instructions further comprising instructions to:
transmit a command to the telecommunications device to accept a request to create the tunnel from the one or more processors responsive to receipt by the telecommunications device of a command from a network service provider to configure the telecommunications device to accept requests to create tunnels from the one or more processors.

* * * * *